United States Patent
Yamine et al.

(10) Patent No.: US 10,349,299 B2
(45) Date of Patent: Jul. 9, 2019

(54) TECHNIQUE FOR CONTROLLING MINIMIZING OF DRIVE TESTS LOG TRACING OF USER EQUIPMENT IN IDLE MODE

(71) Applicant: Telefonaktiebolaget LM Ericsson (publ), Stockholm (SE)

(72) Inventors: Badawi Yamine, Beirut (LB); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 46 days.

(21) Appl. No.: 15/559,897

(22) PCT Filed: Mar. 23, 2015

(86) PCT No.: PCT/EP2015/056100
§ 371 (c)(1),
(2) Date: Sep. 20, 2017

(87) PCT Pub. No.: WO2016/150480
PCT Pub. Date: Sep. 29, 2016

(65) Prior Publication Data
US 2018/0063737 A1    Mar. 1, 2018

(51) Int. Cl.
*H04W 24/10* (2009.01)
*H04W 48/12* (2009.01)

(52) U.S. Cl.
CPC ........... *H04W 24/10* (2013.01); *H04W 48/12* (2013.01)

(58) Field of Classification Search
CPC .................................................. H04W 24/10
See application file for complete search history.

(56) References Cited

U.S. PATENT DOCUMENTS

2011/0201324 A1   8/2011   Persson et al.
2012/0088457 A1*  4/2012   Johansson ............. H04W 24/10
                                            455/67.11
(Continued)

FOREIGN PATENT DOCUMENTS

EP    2437540 A1    4/2012
EP    2579640 A1    4/2013
(Continued)

OTHER PUBLICATIONS

3GPP; 3GPP TS 32.422; Dec. 2014; 3GPP; v12.4.0 (Year: 2014).*
(Continued)

*Primary Examiner* — Pao Sinkantarakorn
*Assistant Examiner* — Stephen N Steiner
(74) *Attorney, Agent, or Firm* — Sage Patent Group (57) ABSTRACT

A technique for controlling Minimizing of Drive Tests, MDT, log tracing, is disclosed. In a method aspect, the method is performed by a base station and comprises sending, from the base station to at least one user equipment being in an idle state, control information comprising control indicators to trigger controlling of MDT log tracing. The control indicators comprise at least two of the following: a first start indicator to instruct starting a log of a new MDT trace, a second stop indicator to instruct stopping a log of an existing MDT trace to be resumed later, a third clear indicator to instruct clearing a log of an existing MDT trace, a fourth resume indicator to instruct resuming a log of a previously stopped MDT trace, a fifth aggregate indicator to instruct aggregating, over a predetermined number of test runs, each log per test run of an existing MDT trace, and a sixth report indicator to instruct immediate reporting of a log of an existing MDT trace.

30 Claims, 7 Drawing Sheets

(56) References Cited

U.S. PATENT DOCUMENTS

2012/0309404 A1* 12/2012 Suzuki ................. H04W 24/10
                                                          455/450
2012/0322386 A1  12/2012 Yi et al.
2017/0181062 A1*  6/2017 Kim ........................ H04W 4/06

FOREIGN PATENT DOCUMENTS

WO        2011120571 A1    10/2011
WO        2012138083 A2    10/2012

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.4.0, Dec. 2014, 1-410.

3GPP, "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT) . . .", 3GPP TS 37.320 V12.2.0, Sep. 2014, 1-26.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.3.0, Sep. 2012, 1-283.

ETSI, "LTE; Evolved Universal Terrestrial Radio Access (E-UTRA); Radio Resource Control (RRC); Protocol specification (3GPP TS 36.331 version 12.3.0 Release 12)", ETSI TS 136 331 V12.3.0, Sep. 2014, 1-383.

ETSI, "LTE; General Packet Radio Service (GPRS) enhancements for Evolved Universal Terrestrial Radio Access Network (E-UTRAN) access (3GPP TS 23.401 version 12.7.0 Release 12)", ETSI TS 123 401 V12.7.0, Jan. 2015, 1-310.

Unknown, Author, "MDT architecture for idle mode reporting", 3GPP TSG-RAN WG2 Meeting #69, R2-100245, San Francisco, CA, Feb. 22-26, 2010, 1-6.

* cited by examiner

TECHNIQUE FOR CONTROLLING MINIMIZING OF DRIVE TESTS LOG TRACING OF USER EQUIPMENT IN IDLE MODE

TECHNICAL FIELD

The present disclosure generally relates to a technique for controlling Minimizing of Drive Tests (MDT) log tracing. The technique of the present disclosure may be embodied in one or more of a method, a computer program product, an apparatus and a data structure.

BACKGROUND

Drive tests are run in a radio network, usually by the employees of an operator or by a third party, for many reasons, such as determining radio coverage. Such test runs are expensive (both in terms of network resource costs and monetary costs due to the man-hours involved) and time consuming.

Due to these drawbacks, a new MDT feature was introduced in the standards to automatically request and collect, from a User Equipment (UE), different measurements and event information. For example, in $3^{rd}$ Generation Partnership Project (3GPP) Technical Specification (TS) 37.320 V.12.2.0, MDT measurement configurations and reporting schemes are defined. The standard 3GPP TS 37.320 applies to a UE in a Universal Mobile Telecommunications System (UMTS) or in a Long Term Evolution (LTE) system.

In the following, several problems not hitherto realized by the prior art will be discussed.

Basically, there are two types of MDT procedures as defined in 3GPP 37.320: (1) 'Logged MDT procedures' used for a UE in RRC_IDLE state (wherein 'RRC' stands for Radio Resource Control and is defined in 3GPP TS 36331 V.12.3.0) and recently also used for UE in RRC_CONNECTED state; and (2) 'Immediate MDT procedures' used for a UE in RRC_CONNECTED state. The MDT measurement (re)configuration and control (such as instructions 'start'/'stop') can be received only by a UE in the RRC_CONNECTED state. This means that there is no possibility to control MDT procedures for UEs which have entered the RRC_IDLE state until they are back into RRC_CONNECTED state, even though the logging of MDT measurements may be very resource demanding (e.g., in terms of UE battery, memory, time, processing, etc.) and the logs may be very large.

As a non-liming example, a UE may enter the RRC_CONNECTED state at time t1, may receive an MDT configuration and then transit to RRC_IDLE state at time t2. At time t3>t2 (i.e., time t3 is later in time than time t2), the operator may want to stop MDT configuration for some reason (e.g., to save UE resources in an emergency situation or to better control measurement collection from one or multiple UEs in certain network situations). With the current standard, the UE has to be in RRC_CONNECTED to be able to receive an instruction to stop a running MDT log procedure. However, depending on the subscriber behavior, the UE may transit to connected mode (e.g., RRC_CONNECTED) again at t4, which may be much later in time than t3. As a result, from t3 until t4, the UE may be running an unwanted MDT log, which in turn unnecessarily consumes UE resources.

In a related scenario, the MDT trace report can be triggered for one particular MDT log trace id. However, in case of presence of multiple MDT logs, there is no possibility to report multiple MDT log results into one single report.

Moreover, although for the UE in RRC_CONNECTED state the network may dynamically control (e.g., 'start'/'stop') MDT traces, it has been found that there exists no flexible solution for stopping MDT traces. In addition, there is no solution to either resume a stopped MDT trace or to aggregate an MDT log for a UE in the connected mode (such as RRC_CONNECTED).

SUMMARY

Accordingly, there is a need for a technique for controlling log tracing that avoids one or more of the problems discussed above, or other, related problems.

In a first aspect, there is provided a method for controlling MDT log tracing, the method being performed in a base station and comprising the step of sending, from the base station to at least one User Equipment, UE, being in an idle state, control information comprising control indicators to trigger controlling of MDT log tracing, wherein the control indicators comprise at least two of a first start indicator to instruct starting a log of a new MDT trace, a second stop indicator to instruct stopping a log of an existing MDT trace to be resumed later, a third clear indicator to instruct clearing a log of an existing MDT trace, a fourth resume indicator to instruct resuming a log of a previously stopped MDT trace, a fifth aggregate indicator to instruct aggregating, over a predetermined number of test runs, each log per test run of an existing MDT trace; and a sixth report indicator to instruct immediate reporting of a log of an existing MDT trace.

In a second aspect, there is provided a method for controlling MDT log tracing, the method being performed in a User Equipment, UE, being in a idle state and comprising the steps of receiving, from a base station, control information comprising control indicators to trigger controlling of MDT log tracing, wherein the control indicators comprise at least two of a first start indicator to instruct starting a log of a new MDT trace, a second stop indicator to instruct stopping a log of an existing MDT trace to be resumed later, a third clear indicator to instruct clearing a log of an existing MDT trace, a fourth resume indicator to instruct resuming a log of a previously stopped MDT trace, a fifth aggregate indicator to instruct aggregating, over a predetermined number of test runs, each log per test run of an existing MDT trace, and a sixth report indicator to instruct immediate reporting of a log of an existing MDT trace.

In a first refinement of the first and second aspects, the idle state may be an RRC_IDLE, Radio Resource Control_IDLE, state. In addition, or alternatively, the base station may be one of a NodeB and an Evolved NodeB, eNB. Further, in addition or alternatively, the control information may be sent in a System Information Block, SIB. Still further, in addition or alternatively, the control information may further comprise an MDT trace identifier, ID, identifying a certain MDT trace to which an operation associated with the respective control indicator is to be applied. In this way, the necessary messaging may be accommodated in existing protocols.

In a second refinement of the first and second aspects, the control indicators may consist of the stop indicator and the clear indicator. In this case, the control information may be sent via one of broadcast and multicast to a plurality of UEs. If so, the control information may further comprise an identification of one or more target UEs, to which the control indicators are to be sent, among the plurality of UEs. Further, the control information may further comprise a condition under which an operation associated with the respective control indicator is to be applied; alternatively, the stop indicator may be one of an MDT logging duration parameter set to a predefined value, an MDT logging duration parameter set to 0, and an explicit command 'stop MDT traces'. In one variant, it is thus possible to immediately discard an MDT log being no longer necessary (e.g., by exploiting immediate execution of the 'stop' or 'clear' instruction).

In a third refinement of the first and second aspects, the aggregate indicator may be one bit or two bits transmitted in the SIB. In this case, if the aggregate indicator has two bits, the bits may be used to code at least the following instructions: MDT configuration and procedure, MDT aggregation for configuration, and MDT aggregation for report. As an example, the following codings may apply: '00' indicates MDT configuration and procedure, '01' indicates MDT aggregation for configuration, '10' indicates MDT aggregation for report and '11' is for future use, ffu. In this way, if the MDT log is not to be discarded, then network resources may be saved by aggregating the MDT log reports (e.g., a plurality of MDT test runs is summarized into one concise report rather than each test run emanating its own report).

In a fourth refinement of the first and second aspects, the control indicators may consist of the resume indicator and the stop indicator. In addition or alternatively, the method may further comprise automatically triggering the sending of the control information. In this case, the triggering step may further comprise monitoring, in areas of active MDT traces, a first trigger generating one or more stop indicators, and monitoring, in the areas of active MDT traces, a second trigger generating one or more resume indicators. The first trigger may be one of an outage of one or more cells and an emergency triggered in a network. Further, the second trigger may be one of clearance of an outage and cease of the emergency. In this way, even a stopped MDT log trace may be resumed immediately if necessary.

In a fifth refinement of the first and second aspects, the report indicator may be one bit transmitted/received in the SIB. If so, especially in the second aspect, the method may further comprise triggering a signalling procedure to send the log from the UE to the base station. In this case, the signalling procedure may be a forced Tracking Area Update, TAU, procedure in the course of which the log is sent in a Radio Resource Control, RRC, Measurement Report message. If so, the TAU procedure may be performed according to $3^{rd}$ Generation Partnership, 3GPP, Technical Specification, TS, 23.401 V11.3.0. In this way, the MDT log reporting can be executed immediately, for example if an operator wants to perform an MDT log test for a very short period (e.g., before TAU timer expiry), or in case the operator wants to check the effect of a new feature on the network for a period that exceeds a TAU timer value.

In a sixth refinement of the first and second aspects, the transmitting/receiving of the control information may further comprise dedicated signalling of the control information. In this case, the dedicated signalling may be performed by a Radio Resource Control, RRC, LoggedMeasurementConfiguration being extended with at least two bits for at least two of the first to sixth control indicators. Alternatively, the dedicated signalling may be performed by one of a dedicated control command and a dedicated new indicator.

In a third aspect, there is provided a computer program product comprising program code portions for performing the method of any one of the first and second aspects when the computer program product is executed on one or more computing devices. The computer program product may be stored on a computer readable recording medium, such as a semiconductor memory, DVD, CD-ROM, etc.

In a fourth aspect, there is provided a base station for controlling MDT log tracing, the base station comprising a component configured to send, from the base station to at least one User Equipment, UE, being in an idle state, control information comprising control indicators to trigger controlling of MDT log tracing, wherein the control indicators comprise at least two of a first start indicator to instruct starting a log of a new MDT trace, a second stop indicator to instruct stopping a log of an existing MDT trace to be resumed later, a third clear indicator to instruct clearing a log of an existing MDT trace, a fourth resume indicator to instruct resuming a log of a previously stopped MDT trace, a fifth aggregate indicator to instruct aggregating, over a predetermined number of test runs, each log per test run of an existing MDT trace and a sixth report indicator to instruct immediate reporting of a log of an existing MDT trace.

In a fifth aspect, there is provided a User Equipment, UE, for controlling MDT log tracing, the UE being in a idle state and comprising a component configured to receive, from a base station, control information comprising control indicators to trigger controlling of MDT log tracing, wherein the control indicators comprise at least two of a first start indicator to instruct starting a log of a new MDT trace, a second stop indicator to instruct stopping a log of an existing MDT trace to be resumed later, a third clear indicator to instruct clearing a log of an existing MDT trace, a fourth resume indicator to instruct resuming a log of a previously stopped MDT trace, a fifth aggregate indicator to instruct aggregating, over a predetermined number of test runs, each log per test run of an existing MDT trace and a sixth report indicator to instruct immediate reporting of a log of an existing MDT trace.

Still further, it is to be noted that the method aspects may also be embodied on the apparatus of the fourth and fifth aspects comprising at least one processor and/or appropriate means for carrying out any one of the method steps.

In a sixth aspect, there is provided a system comprising the base station according to the fourth aspect and the UE according to the fifth aspect. In a refinement of the sixth aspect, the system may further comprise an automatic MDT log resume entity configured to automatically trigger the sending of the control information. The automatic MDT log resume entity may be co-located with an Operations Support System, OSS.

In a seventh aspect, there is provided a data structure for controlling MDT log tracing, the data structure comprising control indicators to trigger controlling of MDT log tracing, wherein the control indicators comprise at least two of a first field comprising a start indicator to instruct starting a log of a new MDT trace, a second field comprising a stop indicator to instruct stopping a log of an existing MDT trace to be resumed later, a third field comprising a clear indicator to instruct clearing a log of an existing MDT trace, a fourth field comprising a resume indicator to instruct resuming a log of a previously stopped MDT trace, a fifth field comprising an aggregate indicator to instruct aggregating, over a predetermined number of test runs, each log per test run of an existing MDT trace and a sixth field comprising a report indicator to instruct immediate reporting of a log of an existing MDT trace.

In a refinement of the seventh aspect, the data structure may be comprised in a System Information Block, SIB. In addition or alternatively, the data structure may further comprise an MDT trace identifier, ID, identifying a certain MDT trace to which an operation associated with the respective control indicator is to be applied. Further, in addition or alternatively, the aggregate indicator may be one bit or two bits received in a System Information Block, SIB. In this case, if the aggregate indicator has two bits, the following or other codings may apply: '00' indicates MDT configuration and procedure, '01' indicates MDT aggregation for configuration, '10' indicates MDT aggregation for report and '11' is for future use, ffu.

BRIEF DESCRIPTION OF THE DRAWINGS

The embodiments of the technique presented herein are described herein below with reference to the accompanying drawings, in which.

DETAILED DESCRIPTION

In the following description, for purposes of explanation and not limitation, specific details are set forth (such as particular signalling steps) in order to provide a thorough understanding of the technique presented herein. It will be apparent to one skilled in the art that the present technique may be practiced in other embodiments that depart from these specific details. For example, the embodiments will primarily be described in the context of LTE or LTE-Advanced (LTE-A), however, the present disclosure is also applicable to legacy techniques, such as UMTS; further, this does not rule out the use of the present technique in connection with (future) technologies consistent with LTE or LTE-A, be it a wirebound communications network or a wireless communications network.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a field programmable gate array (FPGA) or general purpose computer. It will also be appreciated that while the following embodiments are described in the context of methods and devices, the technique presented herein may also be embodied in a computer program product as well as in a system comprising a computer processor and a memory coupled to the processor, wherein the memory is encoded with one or more programs that execute the services, functions and steps disclosed herein.

Without loss of generality, five exemplary realizations of device/method embodiments of the present disclosure to control (e.g., 'stop' or 'resume') MDT log tracing will be presented.

In a first realization, a scheme is proposed that differentiates between 'stop' and 'clear' of MDT logs. One implementation comprises i) stopping an MDT log that needs to be resumed later and ii) clearing any MDT log which is considered by the operator as not needed anymore.

In some approaches, based on MDT standards, once the UE receives a new MDT configuration, the UE may discard existing MDT traces and may clear their MDT log. However, this previous approach is not practical (e.g., for an operator who wants to perform many MDT tests configuration). This is why a new approach, which may be called 'Aggregate MDT configuration', is proposed, and this approach will be described herein below as a second realization.

In a third realization, a scheme is proposed that triggers automatically the stop/start of MDT traces. This scheme is performed by considering any outage or emergency in one or more areas in the network, and then triggering, for example, a 'stop'/'resume' MDT log procedure.

In yet another (fourth) realization, a scheme is described that allows the UE to report immediately (e.g., after network request) any stored MDT log.

In a fifth realization, for a UE that is about to transit from the idle state to the connected state, control (e.g., 'stop'/'resume' configured MDT logging) is performed via an explicit control message (e.g., dedicated signalling via RRC, Radio Resource Control).

Figure 1A:
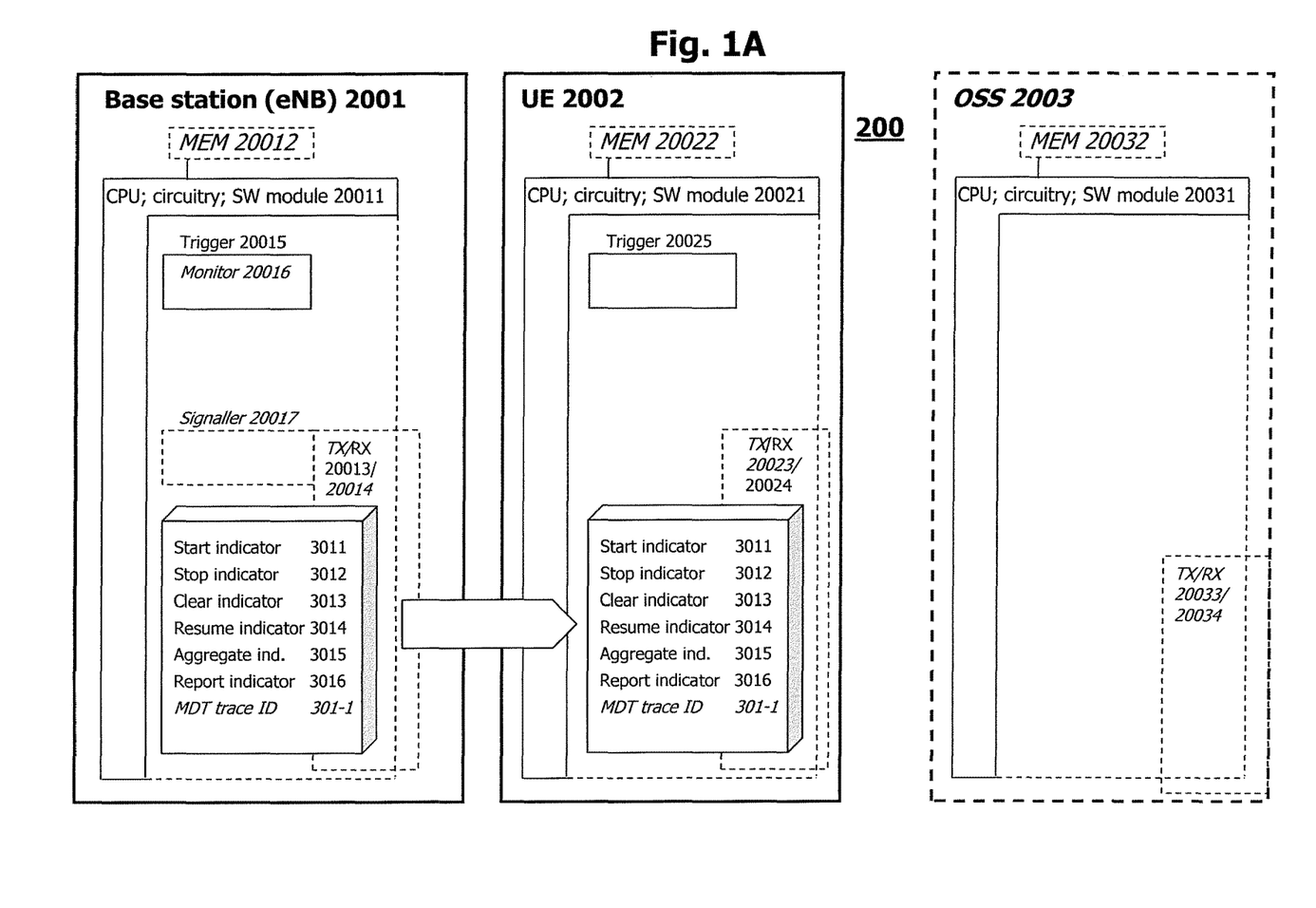
FIG. 1A shows components comprised in an exemplary device embodiment realized in the form of an apparatus (which may reside in, e.g., one of a base station and a UE)

FIG. 1A shows components comprised in an exemplary device embodiment realized in the form of a base station 2001 and/or a UE 2002 (optionally, some realizations may also involve an Operations Support System (OSS) 2003). As shown in FIG. 1A, the base station 2001 comprises a core functionality (e.g., one or more of a Central Processing Unit (CPU), dedicated circuitry and/or a software module) 20011, an optional memory (and/or database) 20012, a transmitter 20013 and an optional receiver 20014. Moreover, the base station 2001 comprises a trigger 20015, and optional monitor 20016 and an optional signaller 20017.

Moreover, the UE 2002 comprises a core functionality (e.g., one or more of a Central Processing Unit (CPU), dedicated circuitry and/or a software module) 20021, an optional memory (and/or database) 20022, an optional transmitter 20023 and a receiver 20024. Further, the UE 2002 comprises a trigger 20025.

Finally, the optional OSS 2003 comprises a core functionality (e.g., one or more of a Central Processing Unit (CPU), dedicated circuitry and/or a software module) 20031, an optional memory (and/or database) 20032, an optional transmitter 20033 and an optional receiver 20034.

In the following paragraphs, assume that x=1, 2 or 3 (for the base station 2001, the UE 2002 or the OSS 2003). As partly indicated by the dashed extensions of the functional block of the CPU 200$x$1, the trigger 20015, the monitor 20016 and the signaller 20017 (of the base station 2001), the trigger 20025 (of the UE 2002) as well as the memory 200$x$1, the transmitter 200$x$3 and the receiver 200$x$4 may at least partially be functionalities running on the CPU 200$x$2, or may alternatively be separate functional entities or means controlled by the CPU 200$x$1 and supplying the same with information. The transmitter and receiver components 200$x$3, 200$x$4 may be realized to comprise suitable interfaces and/or suitable signal generation and evaluation functions.

The CPU 200$x$1 may be configured, for example, using software residing in the memories 200$x$2, to process various data inputs and to control the functions of the memories 200$x$2, the transmitter 200$x$3 and the receiver 200$x$3 (the trigger 20015, the monitor 20016 and the signaller 20017 (of the RNC 2001), the trigger 20025 (of the UE 2002)). The memory 200x2 may serve for storing program code for carrying out the methods according to the aspects disclosed herein, when executed by the CPU 200x1.

It is to be noted that the transmitter 200x3 and the receiver 200x4 may be provided as an integral transceiver, as is indicated in FIG. 1A. It is further to be noted that the transmitters/receivers 200x3, 200x4 may be implemented as physical transmitters/receivers for transceiving via an air interface or a wired connection, as routing/forwarding entities/interfaces between network elements, as functionalities for writing/reading information into/from a given memory area or as any suitable combination of the above. At least one of the trigger 20015, the monitor 20016 and the signaller 20017 (of the RNC 2001), the trigger 20025 (of the UE 2002), or the respective functionalities, may also be implemented as a chipset, module or subassembly.

Figure 1B:
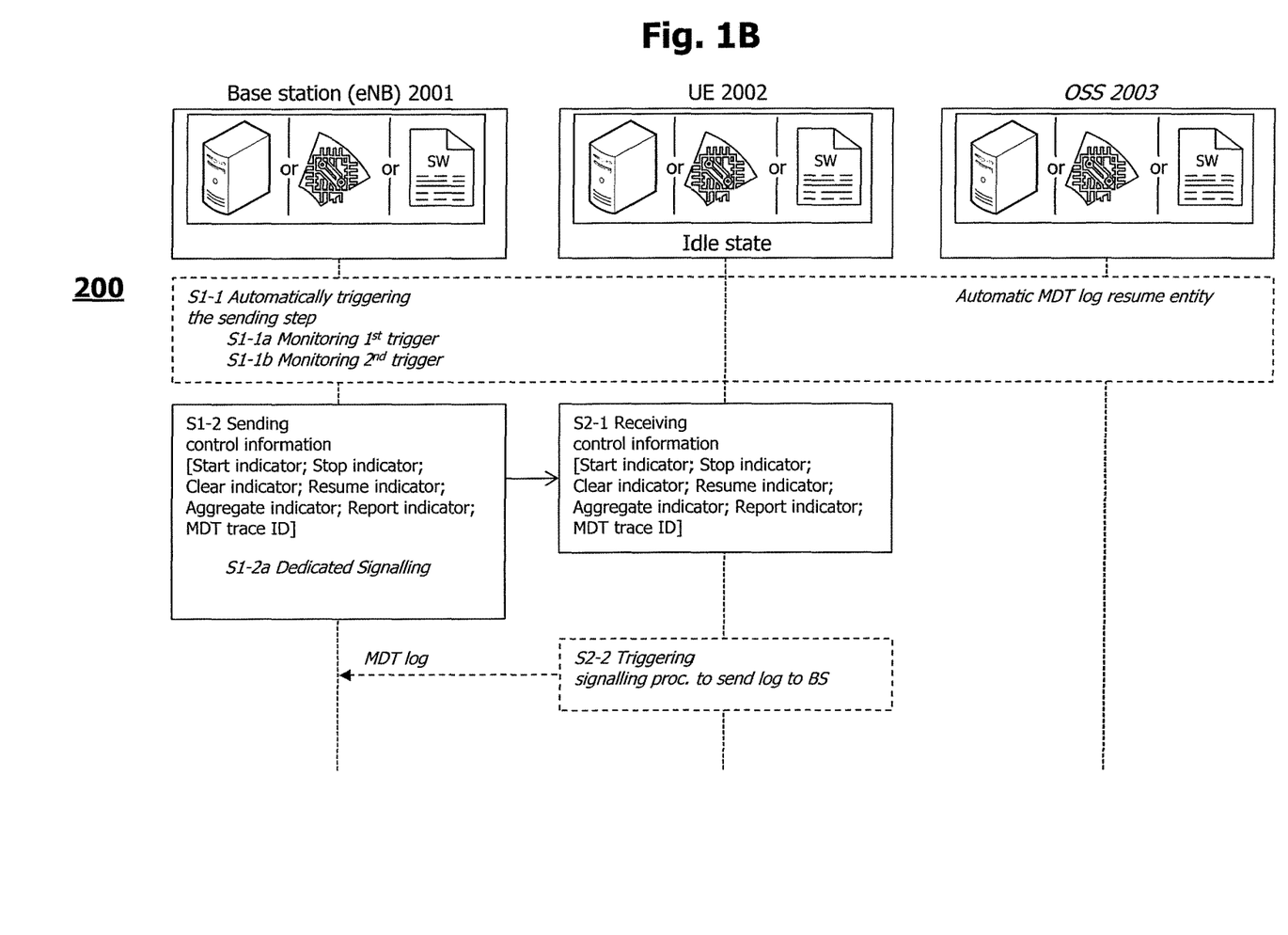
FIG. 1B shows a method embodiment which also reflects the interaction between the components of the apparatus embodiment.

FIG. 1B shows a method embodiment which also reflects the interaction between the components of the device embodiment. In the signalling diagram of FIG. 1B, time aspects between signalling are reflected in the vertical arrangement of the signalling sequence as well as in the sequence numbers. It is to be noted that the time aspects indicated in FIG. 1B do not necessarily restrict any one of the method steps shown to the step sequence outlined in FIG. 1B. This applies in particular to method steps that are functionally disjunctive with each other.

In step S1-2, the sender 20013 (being triggered by the trigger 20015) of the base station 2001 sends, from the base station 2001 to at least one UE 2002 being in an idle state, control information 300 comprising control indicators 3011, 3012, 3013, 3014, 3015, 3016 to trigger controlling of MDT log tracing (see FIG. 3A described herein below for further details).

The control indicators comprise at least two of a first start indicator 3011 to instruct starting a log of a new MDT trace, a second stop indicator 3012 to instruct stopping a log of an existing MDT trace to be resumed later, a third clear indicator 3013 to instruct clearing a log of an existing MDT trace, a fourth resume indicator 3014 to instruct resuming a log of a previously stopped MDT trace, a fifth aggregate indicator 3015 to instruct aggregating, over a predetermined number of test runs, each log per test run of an existing MDT trace and a sixth report indicator 3016 to instruct immediate reporting of a log of an existing MDT trace.

Then, in a step S2-1, the receiver 20014 of the UE 2002 receives, from the base station 2001, the above-describe control information. Thus, the necessary messaging—with minimum impact on the existing protocols—is provided for immediate control of an MDT log even if the UE 2002 is not in the connected state.

As for possible (optional) implementation details pertaining to all realizations described herein, the idle state may be an RRC_IDLE, Radio Resource Control_IDLE, state. As a matter of course, this would include all forms of idle states in other techniques (or protocols) that fulfil the same or a similar function. Further, the base station 2001 may be a NodeB or an Evolved NodeB, eNB; however, this any form of radio base station (RBS) applies as long as it can provide a working air interface (and the required protocols) for at least one UE 2002. Still further, the control information may be sent in a System Information Block, SIB.

The control information may further comprise an MDT trace ID identifying a certain MDT trace to which an operation associated with the respective control indicator is to be applied; this allows the proposed solution to address certain MDT log tracings individually in order to exploit/ apply different options for/to plural (active or inactive) MDT log tracings. In other words, if a control message used comprises a log identifier, the UE 2002 may determine the MDT log, if any, to which the control applies and may then apply the control such as reconfiguration or control command (as described herein below in detail).

Figure 3A:
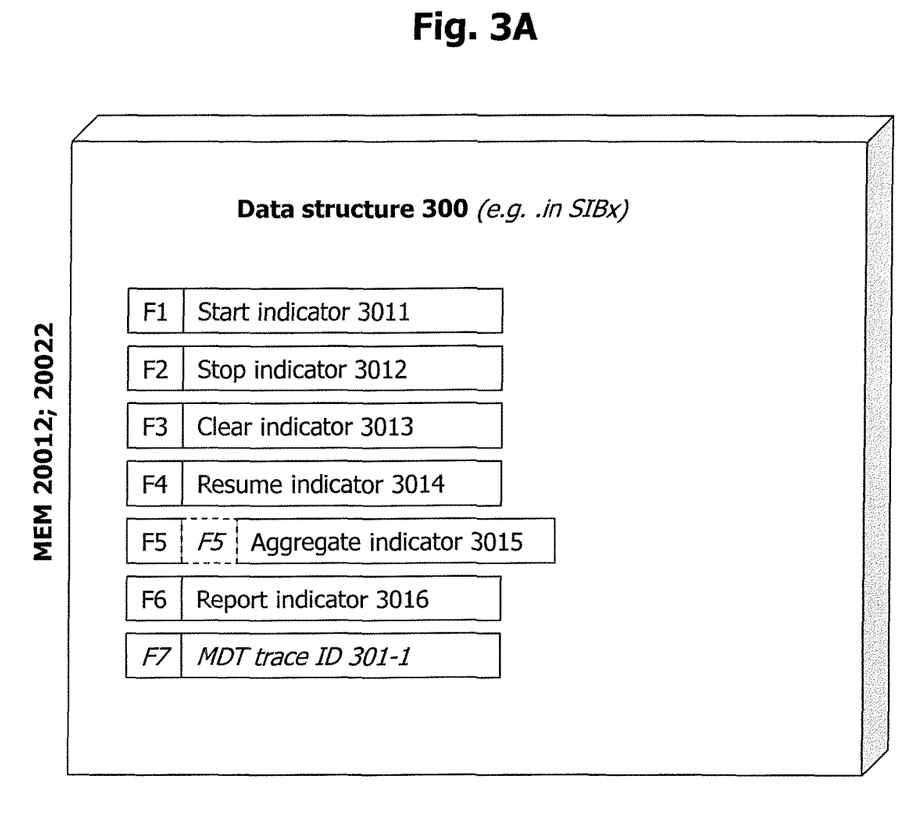
FIG. 3A shows a data structure embodiment.

FIG. 3A shows a first data structure embodiment. In particular, FIG. 3A shows a data structure 300 for controlling MDT log tracing. The data structure comprises control indicators 3011, 3012, 3013, 3014, 3015, 3016 to trigger controlling of MDT log tracing, wherein the control indicators comprise at least two of a first field F1 comprising a start indicator 3011 to instruct starting a log of a new MDT trace, a second field F2 comprising a stop indicator 3012 to instruct stopping a log of an existing MDT trace to be resumed later, a third field F3 comprising a clear indicator 3013 to instruct clearing a log of an existing MDT trace, a fourth field F4 comprising a resume indicator 3014 to instruct resuming a log of a previously stopped MDT trace, a fifth field F5 comprising an aggregate indicator 3015 to instruct aggregating, over a predetermined number of test runs, each log per test run of an existing MDT trace and a sixth field F6 comprising a report indicator 3016 to instruct immediate reporting of a log of an existing MDT trace.

The data structure 300 may be comprised in a SIB. The data structure may, as an option, further comprise an MDT trace ID 301-1 identifying a certain MDT trace to which an operation associated with the respective control indicator is to be applied.

The aggregate indicator may be one bit or two bits received in a System Information Block, SIB. In this case, if the aggregate indicator has two bits, the following or other codings may apply:

'00' indicates MDT configuration and procedure;
'01' indicates MDT aggregation for configuration;
'10' indicates MDT aggregation for report; and
'11' is for future use, ffu.

Realization 1: Stop or Clear MDT Log Trace

In one implementation, the control indicators consist of the stop indicator and the clear indicator. If so, the control information may be sent via one of broadcast and multicast to a plurality of UEs 2002. That is, the network may send, to one or more target UE(s) 2002, a control message for controlling MDT log tracing via broadcast or multicast. In one example, the controlling comprises stopping or cancelling (clearing) a running log configuration. In another example, the broadcast or multicast control may comprise sending a message or an indication in a broadcast or multicast message which may, for example, comprise a system information.

Optionally, the control information further comprises an identification of one or more target UEs 2002, to which the control indicators are to be sent, among the plurality of UEs 2002. That is, the control may also comprise implicit or explicit identification of the log under the control (e.g., especially when more than one logging configurations are possible in a UE 2002 or when different logging configurations or types may potentially be configured in the same or different UEs 2002). In this case, the identification may comprise, for example, log ID, log type, a condition identifying the relevant logs (e.g., any log configured after a certain time and/or in a certain area and/or comprising a certain log configuration parameter meeting a condition). Alternatively, the control may also comprise implicit or explicit identification of the target UEs 2002 (e.g., one or more of a UE ID, a UE group ID, a condition that identifies one or more target UEs 2002, scrambling the control message of a code associated with the target UE(s) 2002).

In some implementations, the control information may further comprise a condition under which an operation associated with the respective control indicator is to be applied. For example, the control may also comprise one or more conditions to allow for conditional control. As such, the control may apply upon fulfilment of one or more conditions only (e.g., if the log size is above a first threshold 1 and/or below a second threshold 2; if the strongest Reference Signal Received Power (RSRP) is below a third threshold 3; if the signal quality is below a fourth threshold 4; if the battery level drops below a fifth threshold 5; etc.).

Moreover, as a further option, the stop indicator may be one of an MDT logging duration parameter set to a pre-defined value, an MDT logging duration parameter set to 0 and an explicit command 'stop MDT traces'. That is, the present realization may comprise sending a message or an indication to stop MDT traces via SI. In an even more specific realization, this may comprise sending an MDT logging duration parameter with a pre-defined value (e.g., 0 seconds or 0 minutes). In an alternative more specific realization, the control may comprise a command e.g. 'stop MDT traces'.

As a further example, if the control comprises 'clear' the log, the UE 2002 does not indicate the log availability to the network when it enters the connected state. If the log was just stopped by the control, the UE 2002 may stop further logging but may still report to the network the logged data until the logging procedure was stopped.

Still further, the following non-limiting use case applies to 'stop' or 'clear' scenarios.

It may be assumed that an MDT log trace is running for a period TMDT, and it may further be assumed that the operator has decided to perform a (planned) outage in the area of the MDT traces. In such use case, the operator may send, shortly before an outage, an immediate 'stop' MDT trace command to the UE 2002 (see FIG. 1A). Once the planned outage is completed, the operator sends another command for an immediate 'resume' of previously suspended trace. On the other hand, if during the period TMDT, an unexpected outage occurs and the proposed third realization (described herein below in greater detail) is not implemented, the operator might then decide to trigger a 'clear' MDT log, since the MDT traces may have been affected by an outage.

Realization 2: Aggregate MDT Configurations and/or Reports

Figure 3B:
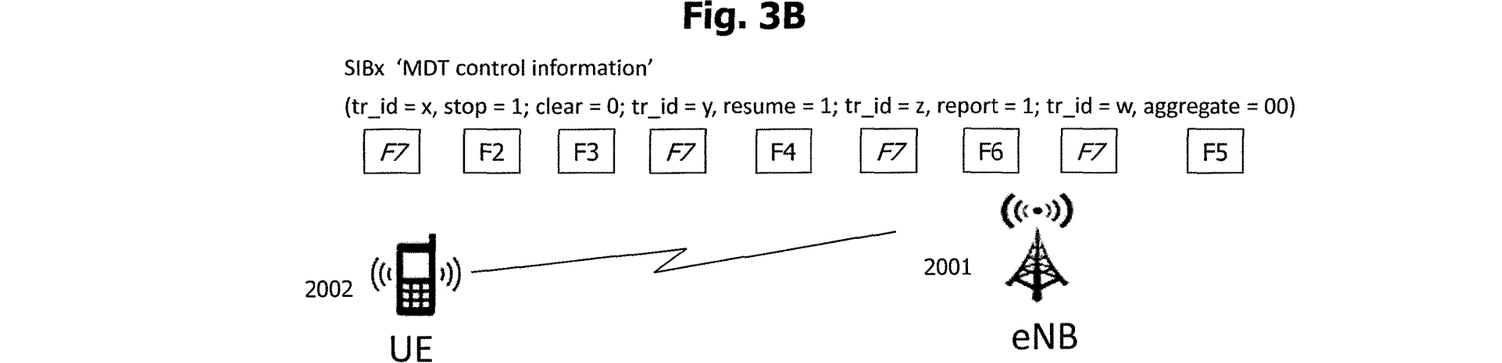
FIG. 3B shows a second example of the present disclosure as a data structure embodiment.
Figure 3C:
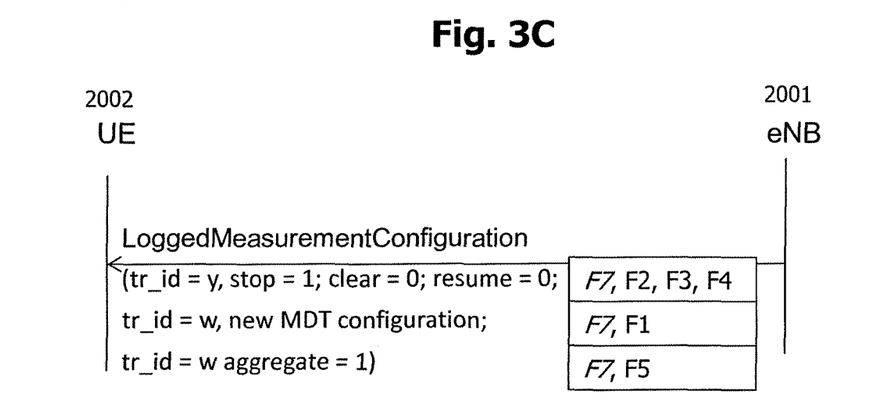
FIG. 3C shows a fifth example of the present disclosure as a data structure embodiment.

Concerning realization 2, reference is made to FIGS. 3A to 3C showing data structures according to the present disclosure.

There are proposals that provide the following implementation: when the UE 2002 receives a new MDT configuration, the UE 2002 may discard previous MDT logging configuration and measurements not even yet reported. With such an approach, a problem arises when the operator wants to perform many repetitive tests (e.g., 10 tests in the use case described herein below).

Basically, the present second realization allows for two types of aggregation, namely:
1—MDT configurations aggregation.
2—MDT reports aggregation.

As for aggregation type 1, the UE 2002 may accept multiple MDT configurations; however, one report is sent for each configuration. This type of aggregation may be used, for example, when the UE 2002 is moving frequently between two systems/access technologies, such as UMTS and LTE. In such a scenario, the UE 2002 may perform MDT log traces on UMTS and report those traces in one report to UMTS. When the UE 2002 moves to LTE, the UE 2002 may report MDT log containing only LTE information.

Conversely, as for type 2, this type of aggregation is illustrated in the following use case.

As an example, it is assumed that during the test period denoted Ttest, there are 100 users in idle mode in the MDT 'area configuration'. If at the end of each radio test the UEs 2002 in that area are requested to send, to the network, an MDT log and if all UEs 2002 were able to send that report, this would yield 100 MDT reports for each operator test. After 10 tests, this would in turn yield 1000 MDT reports.

This problem becomes even more relevant if the UEs 2002 in idle mode are requested to send their MDT report immediately (e.g., before the periodical Tracking Area Update (TAU) expiry procedure). In that case, the UEs 2002 in question might trigger any type of signalling procedure in order to transit temporarily in dedicated mode, in order to be able to report their MDT logs. In one example, the UE 2002 might trigger a forced TAU procedure as described in connection with the fourth realization in greater detail herein below.

Irrespective of the procedure used for a UE 2002 in idle mode to report the MDT logs, multiplying the number of MDT report by the number of UE 2002 at the end of each test, would generate a significant signalling overload during the period Ttest.

In such use cases and in order to reduce the number of MDT log reports, the proposed realization works as follows. The eNB 2001 may send, to the UE 2002, an 'aggregate' command consisting of one bit transmitted in one SIB over the air interface (or via one parameter in a dedicated signalling message for a UE in connected mode). If the value of that bit is equal to 1, the UE 2002 may aggregate a new MDT configuration trace together with existing MDT running or already suspended MDT traces. Otherwise, if the value is 0, no aggregation with existing traces is performed. With such method, when the operator performs 10 tests for 100 UEs 2002, then for each test, the new MDT configuration is aggregated to the previous one. Accordingly, at the end of the 10 tests, only one single report from each UE 2002 is reported. As a result, only 100 MDT log are reported where each report contains the result of the 10 tests. That is a significant saving in comparison to previous approaches, in which 1000 reports are used to report basically the same information.

On the other hand it should be noted that the first realization applies as well to the aggregation method. Thus, the operator could, at any time, stop or clear any aggregated MDT log just by sending the trace id and the command 'stop' or 'clear'.

In FIG. 3B, an example of multiple MDT control commands sent at the same time is shown. In that depiction, where few MDT configuration are aggregated, an MDT control command is sent over the air interface, for example, in one SIB (denoted SIBx), in order to trigger the following immediate actions: stop trace id equal x; resume trace id equal y and send an immediate report for trace id z. It should be noted that in a preferred example, the 'aggregate' command for one trace id is not sent over the air interface, but may be sent in a dedicated signalling together with the configuration of that particular trace_id.

In case a differentiation between type 1 and type 2 is to be made, in one example, two bits may be used as follows for coding the aggregate indicator 3015:

'00' indicates MDT configuration and procedure (which may be performed using a legacy scheme);
'01' indicates MDT aggregation for configuration;
'10' indicates MDT aggregation for report; and
'11' is reserved for future use, ffu.

Naturally, the above bit combinations are exemplary only, and any unique referencing between a bit combination and a pre-defined meaning may be applied.

Realization 3: Resuming a Stopped Trace e.g. Via Self-organizing MDT Entity

Figure 2A:
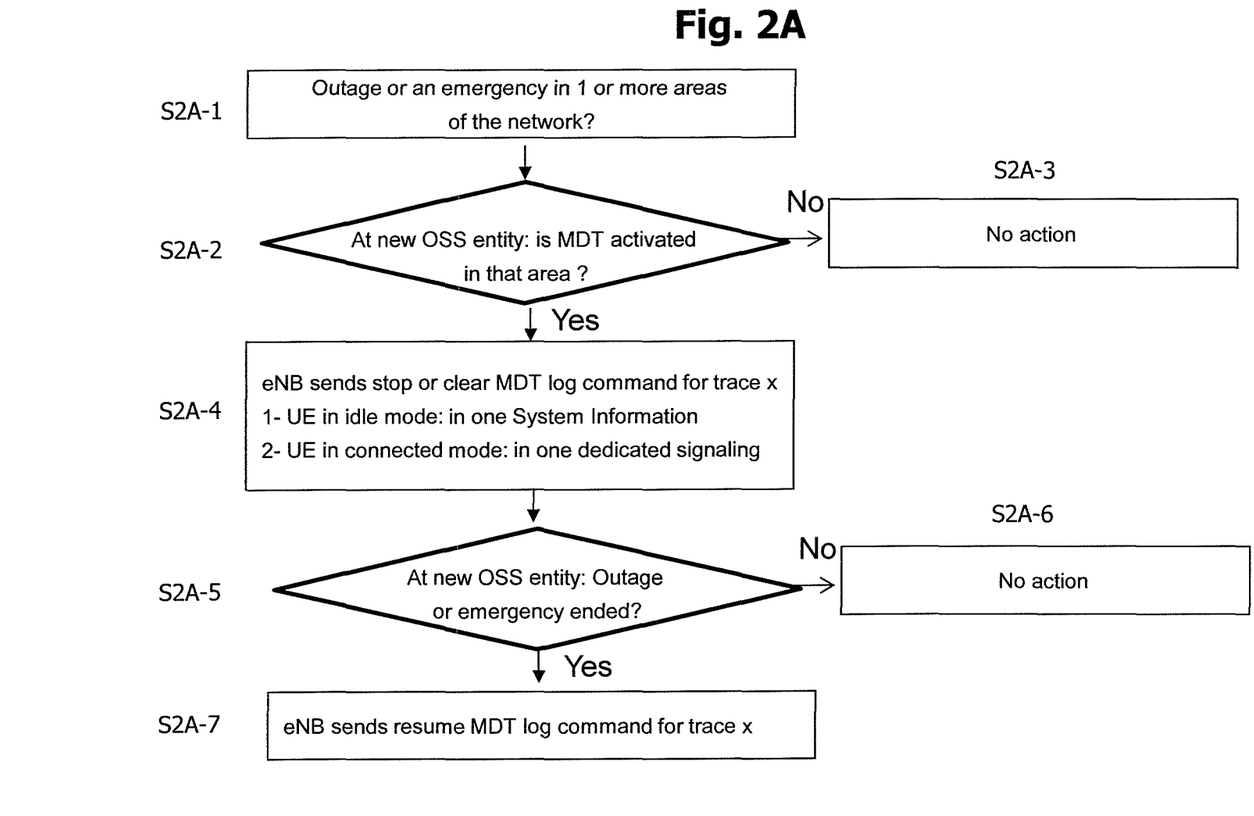
FIG. 2A shows a third example of the present disclosure as a method embodiment.

Concerning realization 3, reference is made to FIG. 2A showing a method embodiment according to the present disclosure.

In realization 3, an MDT log that has been stopped can be later resumed by performing control of that very MDT log. The control means to be used may be similar to the means for stopping, for example a control command (e.g., 'resume' or 'use the previous configuration') or reconfiguration comprised in the control message (e.g., 10 minutes duration instead of 0 minutes). In this regard, the control indicators may comprise the 'resume' indicator and the 'stop' indicator.

Furthermore, the control for resuming may also comprise an implicit or explicit identification of the relevant logs (for instance, the MDT trace ID 301-1 shown in FIG. 3A).

The 'resume' operation may also be configured implicitly together with the 'stop' indication/configuration/command, for example the network may provide a condition upon which the logging may be resumed (e.g., after a certain time or upon a certain radio condition is determined or when the battery level is above a threshold).

In this regard, a new entity called 'automatic MDT log resume' may be introduced. That entity may comprise a software entity installed in the network, for example on the OSS 2003, and that works as shown in FIG. 2A.

When an outage occurs in the network or of if an emergency situation arises, the operator staff reaction might not be immediate in regard to stopping MDT traces as there might be other priorities where the operator is engaged. In other words, the outage or emergency might occur at time t1, but the staff action to stop or clear manually the MDT logs might not occur before t2, which might be much later than t1. This approach is not efficient, as MDT traces would remain active between t1 and t2.

Hence, an automatic 'resume' example is proposed, as shown in FIG. 2A. That is, in an optional step S1-1, the trigger 20016 performs automatic triggering the sending of the control information.

In more detail, as an input, the present realization takes the areas where active MDT traces are running (cf. FIG. 2A, step S2A-1). If no MDT is activated in the area in question, no further control is performed (cf. FIG. 2A, step S2A-3).

Then, the present realization monitors triggers divided into two types (cf. FIG. 3A and FIG. 2A, step S2A-2). That is, the triggering step further comprises, in an optional step S1-1a, monitoring, by the monitor 20016 of the base station 2001, in areas of active MDT traces, a first trigger generating one or more stop indicators and in an optional step S1-1b, monitoring, by the monitor 20016 of the base station 2001, in the areas of active MDT traces, a second trigger generating one or more resume indicators.

One type of trigger, trigger1, may generate an MDT stop command, and another type, trigger2, may generate a resume MDT log command. If trigger1 occurs, 'automatic MDT log resume' entity 2003 may send, to the UE 2002, an MDT 'stop' command. Otherwise, if trigger2 occurs, MDT 'resume' command is sent (cf. FIG. 2A, steps S2A-4).

An example of trigger1 is when one or more cell (or eNB(s)) goes down. Another example is when an emergency in triggered in the network (e.g., when ETWS (Earthquake and Tsunami Warning System) is broadcasted over the air interface in one System Information Block (SIB)).

Trigger2 simply resides, for example, in the outage being cleared or the emergency situation being ceased (cf. FIG. 2A, step S2A-5). If a condition for trigger2 is not fulfilled, no control action is taken (cf. FIG. 2A, step S2A-6). If the condition for trigger2 is fulfilled, the base station 2001 may trigger the 'resume' operation of the previously stopped MDT log trace (cf. FIG. 2A, step S2A-7).

Realization 4: Immediate MDT Log Reporting

Figure 2B:
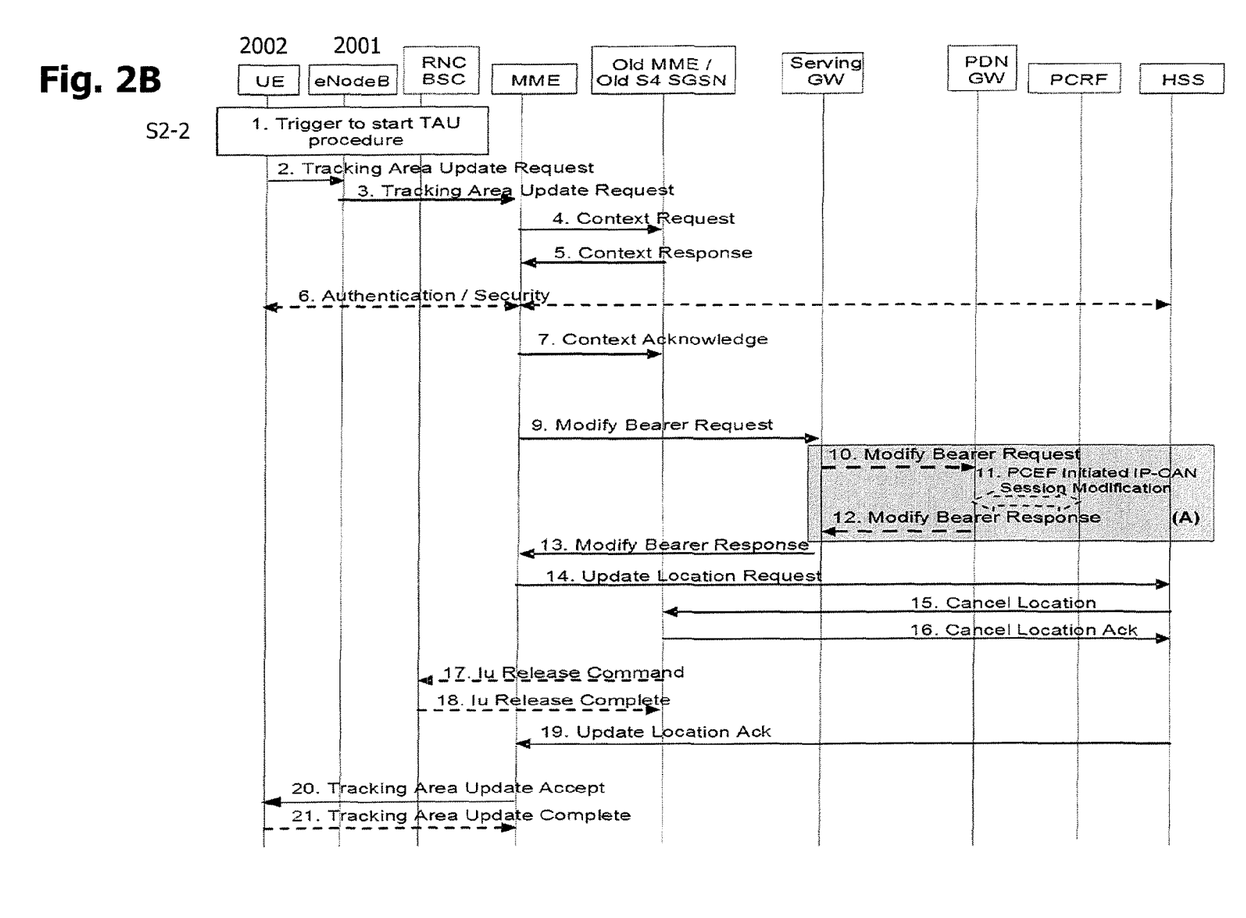
FIG. 2B shows a fourth example of the present disclosure as a method embodiment.
Figure 2C:
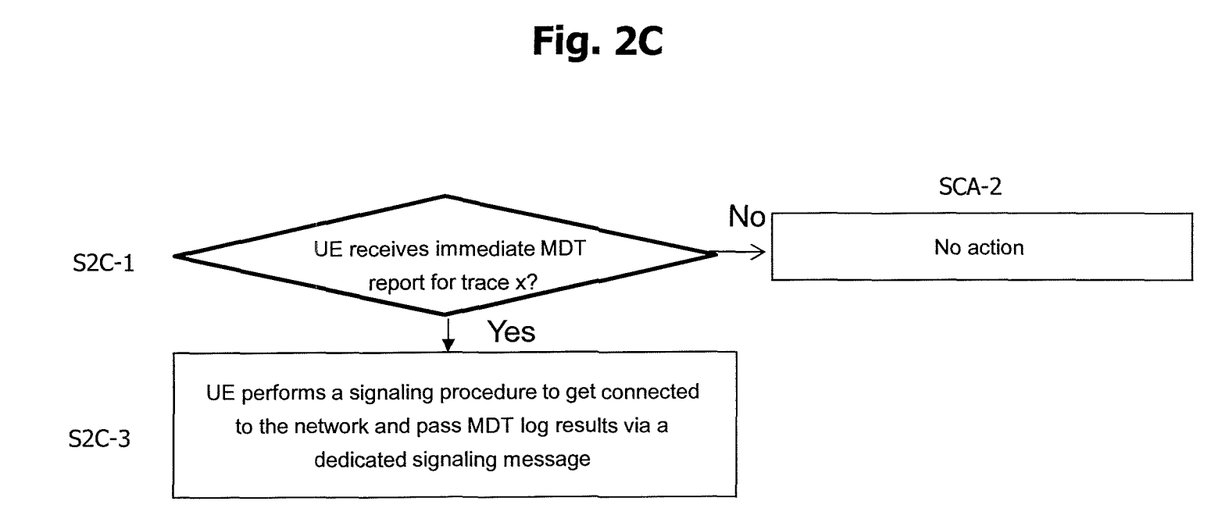
FIG. 2C shows the third example the present disclosure as a method embodiment in greater detail.

Concerning realization 4, reference is made to FIGS. 2B and 2C showing a method embodiment according to the present disclosure.

According to the 3GPP TS 37.320 (Radio measurement collection for minimization of Drive Tests (MDT)), the UE 2002 should send an MDT log presence indicator to the network, eNB, only when the UE 2002 transits into connected mode. It is then up to the eNB 2001 to prompt the UE 2002 to send or not the stored MDT logs. This behaviour may occur in some scenarios, for example when the UE 2002 originates or terminates a call, or whenever the UE 2002 performs a periodical TAU procedure. However, such behaviour may not be practical in a few use cases. For example, if the operator wants to perform MDT log test for a very short period before TAU timer expiry or in case the operator wants to check the effect of a new feature on the network for a period that exceeds TAU timer value, the previous approach is insufficient.

Conversely, the proposed fourth realization performs triggering an immediate MDT log reporting from the UE 2002 to the network. That is, the report indicator may be (at least) one bit received in a System Information Block, SIB. In other words, for a UE 2002 in idle mode, the best way is to send a reporting indicator, denoted 'immediate MDT log report', for example coded in 1 bit in one SIB broadcasted over the air interface (cf. FIG. 2C, step S2C-1). If not so, no further control action is taken (cf. FIG. 2C, step S2C-2).

But if so, then, in an optional step S2-2, the trigger 20025 of the UE 2002 performs triggering a signalling procedure to send the log from the UE 2002 to the base station 2001. That is, if the bit is equal to 1, the UE 2002 triggers a signalling procedure in order to send the MDT log, for example via one dedicated signalling message (cf. also FIG. 2C, step S2C-3).

In one example, that signalling procedure could be a forced periodic TAU (Tracking Area Update) procedure where the MDT log result could be sent in one RRC Measurement Report message (cf. FIG. 2B, step S2-2). Note that any other signalling procedure might be used for the same purpose. A possible flowchart of TAU procedure that can be implemented in the context of the present disclosure is shown in FIG. 2B stemming from 3GPP 23.401.

Realization 5: Controlling MDT Via Dedicated Signaling

Concerning realization 5, reference is made to FIG. 3C showing a data structure embodiment according to the present disclosure.

In a previous approach, when the UE 2002 is about to transit in the connected mode, the UE 2002 is configured to perform, while in idle mode, an MDT log (e.g., via an RRC LoggedMeasurementConfiguration message).

The UE 2002 may start the MDT logging based on all configurations, (e.g., logging a duration denoted as Logging-Duration in 3GPP TS 36.331) that are included in the received RRC LoggedMeasurementConfiguration message. Later, when the UE 2002 is about to transit to the connected mode again, the UE 2002 may send an indication to the eNB 2001 to inform the eNB 2001 about the availability of any stored MDT log. As an example, that indication may be sent while LoggingDuration is running or after its duration expiry. It is then up to the eNB 2001 to retrieve (or not retrieve) the stored MDT log.

At any time during MDT logging, in case the operator wants to stop the UE MDT logging, the UE 2002 needs to enter the connected mode, so that one of the following two implicit procedures can be triggered:

Provided that the UE 2002 is in the connected mode, the network may overwrite the measurement configuration (e.g., reduce the set of requested measurements to the minimum or shortening the logging time [the shortest still not being too short to be functional] or changing the log validity to something short).

Alternatively, a non-logged MDT is configured (note: it is not possible to run in parallel logged and non-logged MDT for the same UE) if the UE 2002 is in the connected mode.

As for a possible implementation, for the implicit example that comprises shortening the logging duration period, the currently specified (3GPP TS 36.331) minimum logging duration is 10 min (minutes) as shown in pseudo code below stemming from 3GPP TS 36.331 for the Logging Duration information element.

```
--ASN1START
LoggingDuration-r10 : : =    ENUMERATED (
                             Min10, min20, min40, min60, min90,
min120, spare 2, spare1)
--ASN1STOP
```

An alternative way of controlling an ongoing MDT trace could be performed via dedicated signalling. That is, in an optional step S1-2*a*, the signaller 20017 of the base station (eNB) 2001 may perform dedicated signalling of the control information.

In one example, as shown in FIG. 3C, the RRC Logged-MeasurementConfiguration is extended with one or more pre-defined parameters allowing for stopping/cancelling a log. For example, a zero logging duration configuration may be configured with 'LoggingDuration'=0 minutes.

In another example, a new indicator or a new control command (e.g., 'stop' or 'cancel') may be sent to the target UE 2002. As in the first realization, the control in realization 2 may also comprise additional information, for example, to identify the relevant logs and/or to allow for conditional control (i.e., the control applies when a certain condition is met).

Of course, not only 'stop' and 'clear' commands apply to the UE 2002 using dedicated signalling, but also all other commands applied for the UE 2002 in idle mode, (e.g., 'resume' and 'aggregate' which are subject to realization 2 and realization 3). As an example shown in FIG. 3C, trace id=y is stopped whereas a new configuration denoted trace id=w is aggregated to already running and suspended traces on the side of the UE 2002.

As has become apparent from the above description of exemplary embodiments and realizations of such embodiments, the present disclosure provides many advantages. Such advantages include, individually or in combination:

Enablement of an "immediate" control (such as 'start'/ 'stop'/'resume'/'aggregate') MDT logging for UEs in RRC_IDLE.

Enablement of 'stop'/'resume' a log, using the network control.

Enablement of control MDT logging for more than one target UEs.

Enablement of immediate reporting of MDT logs for UE in idle mode.

Enablement of sending in one report multiple MDT logs related to aggregated configuration. As a consequence, signaling exchange in the network is saved on.

Enablement of power saving in the UE by dynamically controlling to 'stop'/cancel unnecessary logs or by enabling conditional control.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for controlling Minimizing of Drive Tests (MDT) log tracing, the method being performed in a base station and comprising:
    sending, from the base station to at least one User Equipment (UE) being in an idle state, control information comprising a plurality of control indicators to trigger controlling of MDT log tracing, wherein the plurality of control indicators comprise:
        a stop indicator to instruct stopping a log of an existing MDT trace to be resumed later; and
        a clear indicator to instruct clearing a log of an existing MDT trace; and
    automatically triggering the sending of the control information; wherein the automatically triggering step further comprises:
        monitoring, in areas of active MDT traces, a first trigger generating one or more stop indicators; and
        monitoring, in the areas of active MDT traces, a second trigger generating one or more resume indicators.

2. The method of claim 1, wherein the idle state is a Radio Resource Control IDLE (RRC_IDLE) state.

3. The method of claim 1, wherein the base station is one of a NodeB and an Evolved NodeB (eNB).

4. The method of claim 1, wherein the control information is sent in a System Information Block (SIB).

5. The method of claim 1, wherein the control information further comprises an MDT trace identifier identifying a certain MDT trace to which an operation associated with the respective control indicator is to be applied.

6. The method of claim 1, wherein the control information is sent via one of broadcast and multicast to a plurality of UEs.

7. The method of claim 6, wherein the control information further comprises an identification of one or more target UEs, to which the control indicators are to be sent, among the plurality of UEs.

8. The method of claim 1, wherein the control information further comprises a condition under which an operation associated with the respective control indicator is to be applied.

9. The method of claim 1, wherein the stop indicator is one of:
    an MDT logging duration parameter set to a predefined value;
    an MDT logging duration parameter set to 0; and
    an explicit command 'stop MDT traces'.

10. The method of claim 1, wherein the control information is sent in a System Information Block (SIB) and wherein the plurality of control indicators further comprise an aggregate indicator, the aggregate indicator being one bit or two bits transmitted in the SIB.

11. The method of claim 10, wherein, if the aggregate indicator has two bits, the bits are used to code at least the following instructions:
   MDT configuration and procedure;
   MDT aggregation for configuration;
   MDT aggregation for report.

12. The method of claim 1, wherein the control information is sent in a System Information Block (SIB) and wherein the plurality of control indicators further comprise a report indicator, the report indicator being one bit transmitted in the SIB.

13. The method of claim 1, wherein the first trigger is one of:
   an outage of one or more cells; and an emergency triggered in a network, and
   wherein the second trigger is one of: clearance of an outage; and cease of the emergency.

14. The method of claim 1, wherein the transmitting of the control information further comprises:
   dedicated signaling of the control information.

15. The method of claim 14, wherein the dedicated signaling is performed, when the UE being in the idle mode is about to transit to a connected mode, by a Radio Resource Control (RRC) LoggedMeasurementConfiguration being extended with at least two bits for at least two of the plurality of control indicators.

16. The method of claim 14, wherein the dedicated signaling is performed by one of:
   a dedicated control command; and
   a dedicated new indicator.

17. A method for controlling Minimizing of Drive Tests (MDT) log tracing, the method being performed in a base station and comprising:
   sending, from the base station to at least one User Equipment (UE) being in an idle state, control information comprising a plurality of control indicators to trigger controlling of MDT log tracing, wherein the plurality of control indicators comprise:
      a stop indicator to instruct stopping a log of an existing MDT trace to be resumed later and
      a resume indicator to instruct resuming a log of a previously stopped MDT trace; and
   automatically triggering the sending of the control information, wherein the automatically triggering step further comprises:
      monitoring, in areas of active MDT traces, a first trigger generating one or more stop indicators; and
      monitoring, in the areas of active MDT traces, a second trigger generating one or more resume indicators.

18. The method of claim 17, wherein the control information is sent in a System Information Block (SIB).

19. The method of claim 17, wherein the control information further comprises an MDT trace identifier identifying a certain MDT trace to which an operation associated with the respective control indicator is to be applied.

20. The method of claim 17, wherein the control information is sent in a System Information Block (SIB) and wherein the plurality of control indicators further comprise a report indicator, the report indicator being one bit transmitted in the SIB.

21. The method of claim 17, wherein the first trigger is one of:
   an outage of one or more cells; and an emergency triggered in a network, and
   wherein the second trigger is one of:
   clearance of an outage; and cease of the emergency.

22. A method for controlling Minimizing of Drive Tests (MDT) log tracing, the method being performed in a User Equipment (UE) being in a idle state and comprising the step of:
   receiving, from a base station, control information comprising a plurality of control indicators to trigger controlling of MDT log tracing, wherein the plurality of control indicators comprise:
      a stop indicator to instruct stopping a log of an existing MDT trace to be resumed later; and
      a clear indicator to instruct clearing a log of an existing MDT trace; and
   triggering a signaling procedure to send the log from the UE to the base station; wherein the signaling procedure is a forced Tracking Area Update (TAU) procedure in the course of which the log is sent in a Radio Resource Control (RRC) Measurement Report message.

23. The method of claim 22, wherein:
   the plurality of control indicators further comprise an aggregate indicator being one bit or two bits received in a System Information Block (SIB); or
   the plurality of control indicators further comprise a report indicator being one bit received in a SIB.

24. The method of claim 22, wherein the TAU procedure is performed according to 3rd Generation Partnership (3GPP) Technical Specification (TS) 23.401.

25. A method for controlling Minimizing of Drive Tests (MDT) log tracing, the method being performed in a User Equipment (UE) being in a idle state and comprising the step of:
   receiving, from a base station, control information comprising a plurality of control indicators to trigger controlling of MDT log tracing, wherein the plurality of control indicators comprise:
      a stop indicator to instruct stopping a log of an existing MDT trace to be resumed later; and
      a resume indicator to instruct resuming a log of a previously stopped MDT trace; and
   triggering a signaling procedure to send the log from the UE to the base station; wherein the signaling procedure is a forced Tracking Area Update (TAU) procedure in the course of which the log is sent in a Radio Resource Control (RRC) Measurement Report message.

26. The method of claim 25, wherein:
   the plurality of control indicators further comprise an aggregate indicator being one bit or two bits received in a System Information Block (SIB); or
   the plurality of control indicators further comprise a report indicator being one bit received in a SIB.

27. A base station for controlling Minimizing of Drive Tests (MDT) log tracing, the base station comprising:
   a processor, and
   a memory operatively coupled to the processor and storing instructions executable by the processor, whereby the processor is configured to send, from the base station to at least one User Equipment (UE) in an idle state, control information comprising a plurality of control indicators to trigger controlling of MDT log tracing, wherein the plurality of control indicators comprise:
      a stop indicator to instruct stopping a log of an existing MDT trace to be resumed later; and
      a clear indicator to instruct clearing a log of an existing MDT trace; and
   wherein the processor is further configured to automatically trigger the sending of the control information, comprises:

monitor, in areas of active MDT traces, a first trigger generating one or more stop indicators; and monitor, in the areas of active MDT traces, a second trigger generating one or more resume indicators.

28. A base station for controlling Minimizing of Drive Tests (MDT) log tracing, the base station comprising:

a processor, and a memory operatively coupled to the processor and storing instructions executable by the processor, whereby the processor is configured to send, from the base station to at least one User Equipment (UE) in an idle state, control information comprising a plurality of control indicators to trigger controlling of MDT log tracing, wherein the plurality of control indicators comprise:

a stop indicator to instruct stopping a log of an existing MDT trace to be resumed later; and a resume indicator to instruct resuming a log of a previously stopped MDT trace; and wherein the processor is further configured to automatically trigger the sending of the control information, comprises:

monitor, in areas of active MDT traces, a first trigger generating one or more stop indicators; and monitor, in the areas of active MDT traces, a second trigger generating one or more resume indicators.

29. A User Equipment (UE) for controlling Minimizing of Drive Tests (MDT) log tracing, the UE comprising:

a processor, and a memory operatively coupled to the processor and storing instructions executable by the processor, whereby the processor is configured to receive from a base station, while the UE is in idle state, control information comprising a plurality of control indicators to trigger controlling of MDT log tracing, wherein the plurality of control indicators comprise:

a stop indicator to instruct stopping a log of an existing MDT trace to be resumed later; and a clear indicator to instruct clearing a log of an existing MDT trace; and wherein the processor is further configured to trigger a signaling procedure to send the log from the UE to the base station; wherein the signaling procedure is a forced Tracking Area Update (TAU) procedure in the course of which the log is sent in a Radio Resource Control (RRC) Measurement Report message.

30. A User Equipment (UE) for controlling Minimizing of Drive Tests (MDT) log tracing, the UE comprising:

a processor, and a memory operatively coupled to the processor and storing instructions executable by the processor, whereby the processor is configured to receive from a base station, while the UE is in a idle state, control information comprising a plurality of control indicators to trigger controlling of MDT log tracing, wherein the plurality of control indicators comprise:

a stop indicator to instruct stopping a log of an existing MDT trace to be resumed later; and a resume indicator to instruct resuming a log of a previously stopped MDT trace; and wherein the processor is further configured to trigger a signaling procedure to send the log from the UE to the base station; wherein the signaling procedure is a forced Tracking Area Update (TAU) procedure in the course of which the log is sent in a Radio Resource Control (RRC) Measurement Report message.

* * * * *